(12) United States Patent
Choi et al.

(10) Patent No.: US 8,740,040 B2
(45) Date of Patent: Jun. 3, 2014

(54) SOLDER INJECTION HEAD

(71) Applicant: Samsung Electro-Mechanics Co., Ltd., Gyunggi-do (KR)

(72) Inventors: Jin Won Choi, Gyunggi-do (KR); Yon Ho You, Gyunggi-do (KR); Ki Ju Lee, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 13/664,035

(22) Filed: Oct. 30, 2012

(65) Prior Publication Data

US 2014/0034707 A1 Feb. 6, 2014

(30) Foreign Application Priority Data

Jul. 31, 2012 (KR) .................. 10-2012-0083764

(51) Int. Cl.
*B23K 1/00* (2006.01)
(52) U.S. Cl.
USPC ............................ 228/33; 228/256; 228/260
(58) Field of Classification Search
None
See application file for complete search history.

(56) References Cited

U.S. PATENT DOCUMENTS

| | | | | |
|---|---|---|---|---|
| 5,244,143 | A * | 9/1993 | Ference et al. | 228/180.21 |
| 6,015,083 | A * | 1/2000 | Hayes et al. | 228/254 |
| 6,056,191 | A * | 5/2000 | Brouillette et al. | 228/254 |
| 6,231,333 | B1 * | 5/2001 | Gruber et al. | 425/546 |
| 7,028,879 | B2 * | 4/2006 | Farrar et al. | 228/33 |
| 2001/0010324 | A1 * | 8/2001 | Maeda et al. | 228/256 |
| 2005/0263571 | A1 * | 12/2005 | Belanger et al. | 228/256 |
| 2006/0231591 | A1 * | 10/2006 | Gruber et al. | 228/101 |
| 2007/0164089 | A1 * | 7/2007 | Gaugler | 228/256 |
| 2007/0246518 | A1 * | 10/2007 | Cordes et al. | 228/256 |
| 2007/0272389 | A1 * | 11/2007 | Gruber et al. | 164/488 |
| 2008/0014406 | A1 * | 1/2008 | Chey et al. | 428/131 |
| 2008/0023526 | A1 * | 1/2008 | Biggs et al. | 228/33 |
| 2008/0047680 | A1 * | 2/2008 | Schultz | 164/133 |
| 2008/0073413 | A1 * | 3/2008 | Mizuno et al. | 228/180.22 |
| 2008/0272177 | A1 * | 11/2008 | Cordes et al. | 228/33 |
| 2008/0302860 | A1 * | 12/2008 | Biggs et al. | 228/179.1 |
| 2009/0008057 | A1 * | 1/2009 | Cordes et al. | 164/151.4 |
| 2009/0037016 | A1 * | 2/2009 | Chainer et al. | 700/146 |
| 2009/0039142 | A1 * | 2/2009 | Bezama et al. | 228/249 |
| 2009/0183849 | A1 * | 7/2009 | Budd et al. | 164/61 |

(Continued)

FOREIGN PATENT DOCUMENTS

| | | | |
|---|---|---|---|
| JP | 56-066374 A | * | 7/1981 |
| KR | 10-2009-0087191 A | | 8/2009 |

(Continued)

OTHER PUBLICATIONS

Office Action dated Sep. 16, 2013 from corresponding Korean Patent Application No. 10-2012-0083764 and its English summary provided by the clients.

*Primary Examiner* — Kiley Stoner
(74) *Attorney, Agent, or Firm* — Ladas & Parry LLP

(57) ABSTRACT

Disclosed herein a solder injection head including: a bump material storing part having a bump material stored therein; a discharging part having one side connected to the bump material storing part and discharging the bump material to the outside; a heating part formed at at least one side of the discharging part and heating the bump material passing through the discharging part; and a press-fitting part press-fitting the bump material discharged to the outside and injecting the bump material onto a substrate.

12 Claims, 6 Drawing Sheets

(56) References Cited

U.S. PATENT DOCUMENTS

| | | | |
|---|---|---|---|
| 2009/0294090 A1* | 12/2009 | Bouchard et al. | 164/262 |
| 2009/0301685 A1* | 12/2009 | Gruber et al. | 164/303 |
| 2010/0252225 A1* | 10/2010 | Schultz | 164/303 |
| 2011/0049759 A1* | 3/2011 | Garant et al. | 264/259 |
| 2011/0079632 A1* | 4/2011 | Chey et al. | 228/260 |
| 2011/0127312 A1* | 6/2011 | Gruber et al. | 228/33 |
| 2012/0132694 A1* | 5/2012 | Buchwalter et al. | 228/33 |
| 2012/0193833 A1* | 8/2012 | Budd et al. | 264/297.2 |
| 2012/0234902 A1* | 9/2012 | Chey et al. | 228/260 |

FOREIGN PATENT DOCUMENTS

| | | | |
|---|---|---|---|
| KR | 2010-121055 A | * | 11/2010 |
| KR | 2001-064342 A | * | 6/2011 |
| KR | 2011-061705 A | * | 6/2011 |
| KR | 2011-062229 A | * | 6/2011 |
| WO | WO 2011/002156 A2 | * | 6/2011 |

* cited by examiner

SOLDER INJECTION HEAD

CROSS REFERENCE TO RELATED APPLICATION

This application claims the benefit of Korean Patent Application No. 10-2012-0083764, filed on Jul. 31, 2012, entitled "Solder Injection Head", which is hereby incorporated by reference in its entirety into this application.

BACKGROUND OF THE INVENTION

1. Technical Field

The present invention relates to a solder injection head.

2. Description of the Related Art

Bumps may be formed on a substrate in order to mount electronic components on the substrate. Examples of a typical method of forming the bump include a solder paste printing method, a solder ball mounting method, and a melted solder injection method. The solder paste printing method is a method in which a solder paste is printed on the substrate and a reflow is performed on the solder paste. The solder ball mounting method is a method in which a fine solder ball is directly mounted on the substrate. The melted solder injection method is a method in which a melted solder is directly injected onto the substrate or injected onto the substrate using a mask. In an apparatus for directly injecting the melted solder, as disclosed in U.S. Pat. No. 6,231,333, all solders are stored in the melted state in the solder injection apparatus. In this case, the melted solders may be left in the solder injection apparatus for a long period of time. In the case in which the solders are left in the melted state for a long period of time, the solders are oxidized, such that it is difficult to form a reliable bump later.

SUMMARY OF THE INVENTION

The present invention has been made in an effort to provide a solder injection head capable of preventing a bump material from being oxidized.

Further, the present invention has been made in an effort to provide a solder injection head capable of preventing a bump material from being wasted by controlling an amount of bump material.

Further, the present invention has been made in an effort to provide a solder injection head capable of uniformly applying a bump material onto a substrate.

Further, the present invention has been made in an effort to provide a solder injection head capable of preventing a bump material applied onto a substrate from being re-oxidized.

According to a first preferred embodiment of the present invention, there is provided a solder injection head including: a bump material storing part having a bump material stored therein; a discharging part having one side connected to the bump material storing part and discharging the bump material to the outside; a heating part formed at at least one side of the discharging part and heating the bump material passing through the discharging part; and a press-fitting part press-fitting the bump material discharged to the outside and injecting the bump material onto a substrate.

The press-fitting part may move vertically to inject the discharged bump material onto the substrate.

The press-fitting part may be made of porous silicon rubber or ceramic.

The solder injection head may further include a pressure bar inserted into the bump material storing part and pushing the bump material to the discharging part.

The solder injection head may further include a flux storing part having a flux stored therein.

The press-fitting part may be formed to be partially inserted into the flux storing part.

The press-fitting part may discharge the flux to the outside.

The bump material storing part may store both of the bump material and a flux.

The solder injection head may further include a controlling part formed between the bump material storing part and the discharging part and controlling an amount of bump material introduced into the discharging part.

The bump material may be a solder ball or a solder paste.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
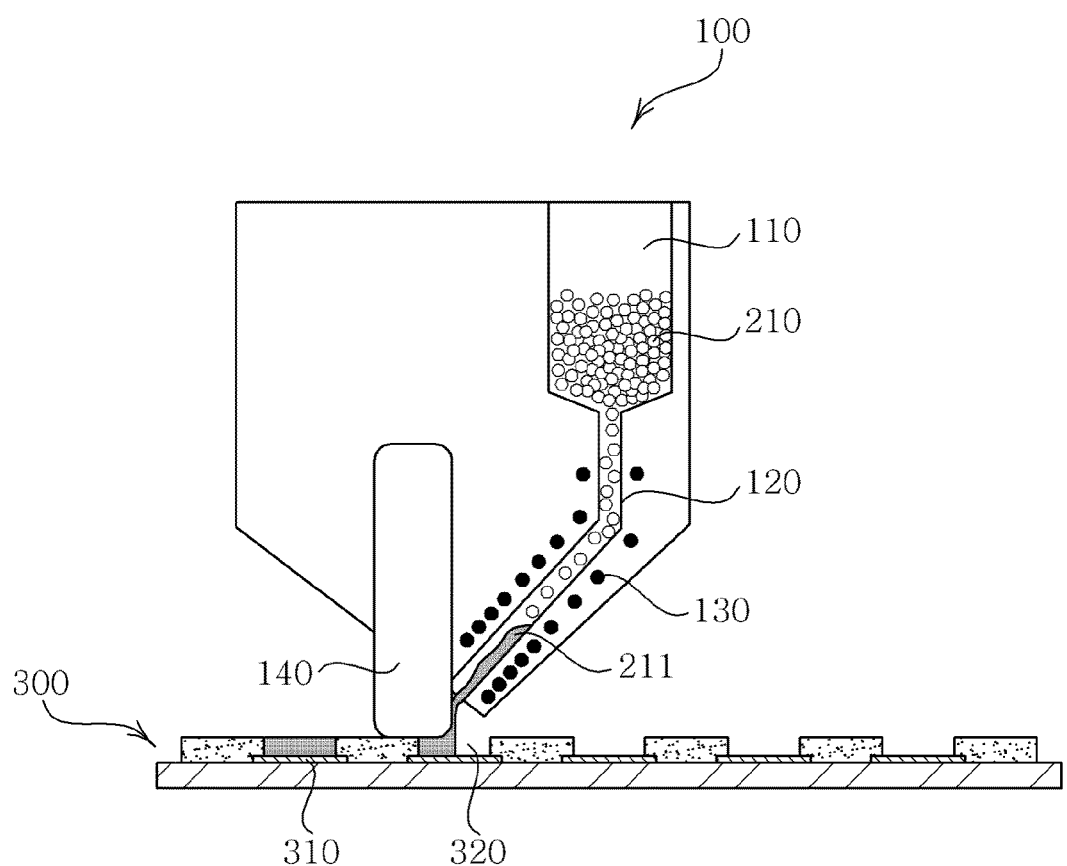
FIG. 1 is a diagram showing a solder injection head according to a preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

A solder injection head is a portion through which a bump material is directly injected onto a substrate among components of a solder injection apparatus. The present invention relates to the solder injection head and other components of the solder injection apparatus and a relationship between the solder injection head and other components are well-known in the prior art. Therefore, a description and an illustration thereof will be omitted for convenience of explanation.

FIG. 1 is a diagram showing a solder injection head according to a preferred embodiment of the present invention.

Referring to FIG. 1, the solder injection head 100 may include a bump material storing part 110, a discharging part 120, a heating part 130, and a press-fitting part 140.

The bump material storing part 110 may have a bump material 210 stored therein. The bump material 210 may be injected onto a substrate 300 and then subjected to a process such as a reflow process, or the like, to become a bump. The bump material 210 may be a solder ball or a solder paste. However, the bump material 210 is not limited to the solder ball or the solder paste, but may also be any materials selected by those skilled in the art as long as it may form a bump. In addition, although not shown, both of the bump material 210 and a flux may be stored in the bump material storing part 110.

One side of the discharging part 120 may be connected to the bump material storing part 110 and the other side thereof may be connected to the outside. The discharging part 120 may discharge the bump material 210 stored in the bump material storing part 110 to the outside. Here, the bump material 210 may be heated and melted by the heating part 130 while passing through the discharging part 120. That is, the bump material 210 may be discharged in a melted state when 211 being discharged to the outside through the discharging part 120.

The heating part 130 may be formed at at least one side of the discharging part 120. The heating part 130 may heat the bump material 210 passing through the discharging part 120. In the preferred embodiment of the present invention, the case in which the heating parts 130 are formed at both sides of the discharging part 120 is shown. For example, the heating part 130 may be a heater. However, a kind of heating part 130 is not limited to the heater. That is, any heating part 130 may be used as long as it may heat the bump material 210 passing through the discharging part 120 to make the heated bump material 210 a melted state. In addition, a number or position of the heating part 130 may be easily modified by those skilled in the art.

The press-fitting part 140 may inject the bump material 210 in the melted state 211 discharged through the discharging part 120 onto the substrate 300. Here, the press-fitting part 140 may move vertically to press-fit the bump material 210, thereby injecting the bump material 210 onto a pad 310 of the substrate 300. The vertical movement of the press-fitting part 140 may be performed by vertical movement of the solder injection head 100. In addition, it is obvious to those skilled in the art that the vertical movement of the solder injection head 100 may also be performed by the solder injection apparatus (not shown).

According to the preferred embodiment of the present invention, the press-fitting part 140 may be made of porous silicon rubber or ceramic.

In the solder injection head 100 according to the preferred embodiment of the present invention, a portion of the other side of the discharging part 120 and a portion of a side of the press-fitting 140 may be disposed adjacently to each other. Therefore, the bump material 210 in the melted state 211 discharged through the discharging part 120 may descend along the side of the press-fitting part 140 to thereby be applied onto the substrate 300. Thereafter, the bump material 210 in the melted state 211 applied onto the substrate 300 may be injected into an opening 320 in which the pad 310 is formed, by the vertical movement of the press-fitting part 140.

The solder injection head 100 according to the preferred embodiment of the present invention may heat and melt only the bump material 210 which is to be discharged to the outside. Therefore, it is possible to prevent the bump material 210 from being left in the melted state for a long period of time and oxidized.

Figure 2:
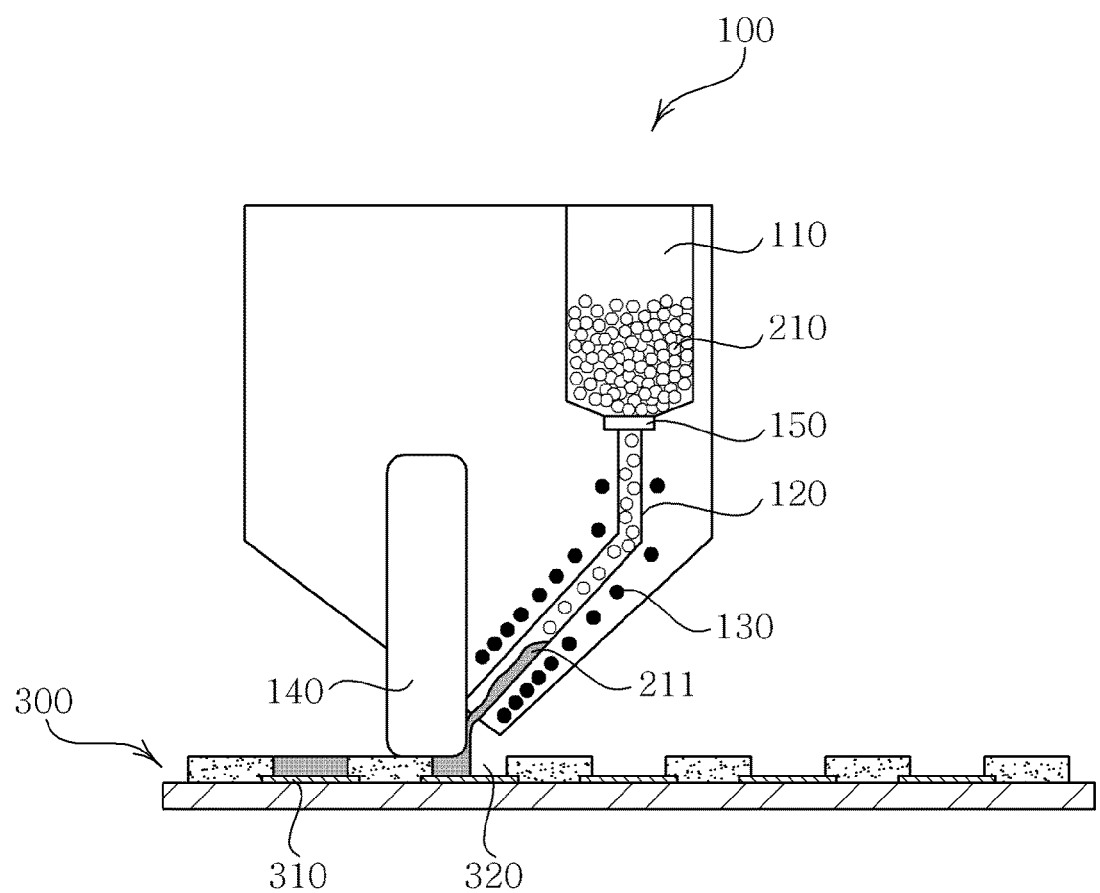
FIG. 2 is a diagram showing a solder injection head according to another preferred embodiment of the present invention.

FIG. 2 is a diagram showing a solder injection head according to another preferred embodiment of the present invention.

Referring to FIG. 2, the solder injection head 100 may include a bump material storing part 110, a discharging part 120, a heating part 130, a press-fitting part 140 and a controlling part 150.

The bump material storing part 110 may have a bump material 210 stored therein. The bump material 210 may be a solder ball or a solder paste. However, the bump material 210 is not limited to the solder ball or the solder paste, but may also be any materials selected by those skilled in the art as long as it may form a bump. In addition, although not shown, both of the bump material 210 and a flux may be stored in the bump material storing part 110.

One side of the discharging part 120 may be connected to the bump material storing part 110 and the other side thereof may be connected to the outside. The discharging part 120 may discharge the bump material 210 stored in the bump material storing part 110 to the outside. Here, the bump material 210 may be heated and melted by the heating part 130 while passing through the discharging part 120. That is, the bump material 210 may be discharged in a melted state 211 when being discharged to the outside through the discharging part 120.

The heating part 130 may be formed at at least one side of the discharging part 120. The heating part 130 may heat the bump material 210 passing through the discharging part 120. In the preferred embodiment of the present invention, the case in which the heating parts 130 are formed at both sides of the discharging part 120 is shown. For example, the heating part 130 may be a heater. However, a kind of heating part 130 is not limited to the heater. That is, any heating part 130 may be used as long as it may heat the bump material 210 passing through the discharging part 120 to make the heated bump material 210 a melted state 211. In addition, the number or the positions of the heating part 130 may be easily modified by those skilled in the art.

The press-fitting part 140 may inject the bump material 210 in the melted state 211 discharged through the discharging part 120 onto the substrate 300. Here, the press-fitting part 140 may move vertically to press-fit the bump material 210, thereby injecting the bump material 210 onto a pad 310 of the substrate 300. The vertical movement of the press-fitting part 140 may be performed by vertical movement of the solder injection head 100.

The controlling part 150 may be formed between the bump material storing part 110 and the discharging part 120. The controlling part 150 may control an amount of bump material introduced into the discharging part 120. The controlling part 150 may be a valve, a rotating disk, or the like.

However, a kind of controlling part is not limited thereto. That is, any controlling part may be used as long as it may control an amount of bump material 210 discharged to the discharging part 120.

In the solder injection head 100 according to the preferred embodiment of the present invention, the amount of bump material 210 is adjusted by the controlling part 150, thereby making it possible to uniformly apply the bump material 210 onto the substrate 300. Therefore, the amount of bump material injected onto each of the pads 310 of the substrate 300 may also be uniform. Therefore, it is possible to allow each of the bumps (not shown) formed on the substrate 300 later to have the same size as each other.

Figure 3:
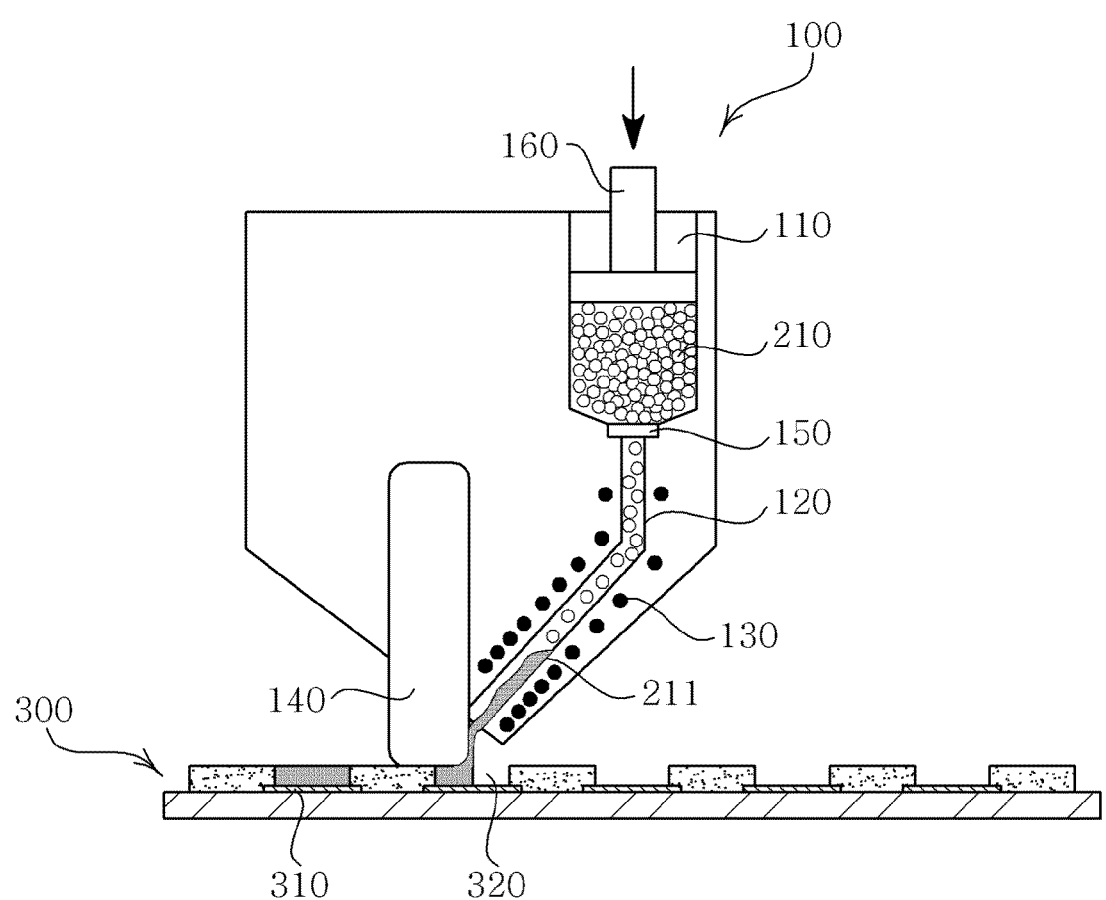
FIG. 3 is a diagram showing a solder injection head according to still another preferred embodiment of the present invention.

FIG. 3 is a diagram showing a solder injection head according to still another preferred embodiment of the present invention.

Referring to FIG. 3, the solder injection head 100 may include a bump material storing part 110, a discharging part 120, a heating part 130, a press-fitting part 140, a controlling part 150, and a pressure bar 160.

The bump material storing part 110 may have a bump material 210 stored therein. The bump material 210 may be a solder ball or a solder paste. However, the bump material 210 is not limited to the solder ball or the solder paste, but may also be any materials selected by those skilled in the art as long as it may form a bump. In addition, although not shown, both of the bump material 210 and a flux may be stored in the bump material storing part 110.

One side of the discharging part 120 may be connected to the bump material storing part 110 and the other side thereof may be connected to the outside. The discharging part 120 may discharge the bump material 210 stored in the bump material storing part 110 to the outside. Here, the bump material 210 may be heated and melted by the heating part 130 while passing through the discharging part 120. That is, the bump material 210 may be discharged in a melted state 211 when being discharged to the outside through the discharging part 120.

The heating part 130 may be formed at at least one side of the discharging part 120. The heating part 130 may heat the bump material 210 passing through the discharging part 120. In the preferred embodiment of the present invention, the case in which the heating parts 130 are formed at both sides of the discharging part 120 is shown. For example, the heating part 130 may be a heater. However, a kind of heating part 130 is not limited to the heater. That is, any heating part 130 may be used as long as it may heat the bump material 210 passing through the discharging part 120 to make the heated bump material 210 a melted state 211. In addition, the number or the positions of heating parts 130 may be easily modified by those skilled in the art.

The press-fitting part 140 may inject the bump material 210 in the melted state 211 discharged through the discharging part 120 onto the substrate 300. Here, the press-fitting part 140 may move vertically to press-fit the bump material 210, thereby injecting the bump material 210 onto a pad 310 of the substrate 300. The vertical movement of the press-fitting part 140 may be performed by vertical movement of the solder injection head 100.

The controlling part 150 may be formed between the bump material storing part 110 and the discharging part 120. The controlling part 150 may control an amount of bump material introduced into the discharging part 120. The controlling part 150 may be a valve, a rotating disk, or the like. However, a kind of controlling part is not limited thereto. That is, any controlling part may be used as long as it may control an amount of bump material 210 discharged to the discharging part 120.

The pressure bar 160 may be inserted into the bump material storing part 110. The pressure bar 160 may move vertically to push the bump material 210 to the discharging part 120. The pressure bar 160 as described above may allow the bump material stored in the bump material storing part 110 to be smoothly discharged to the discharging part 120.

Figure 4:
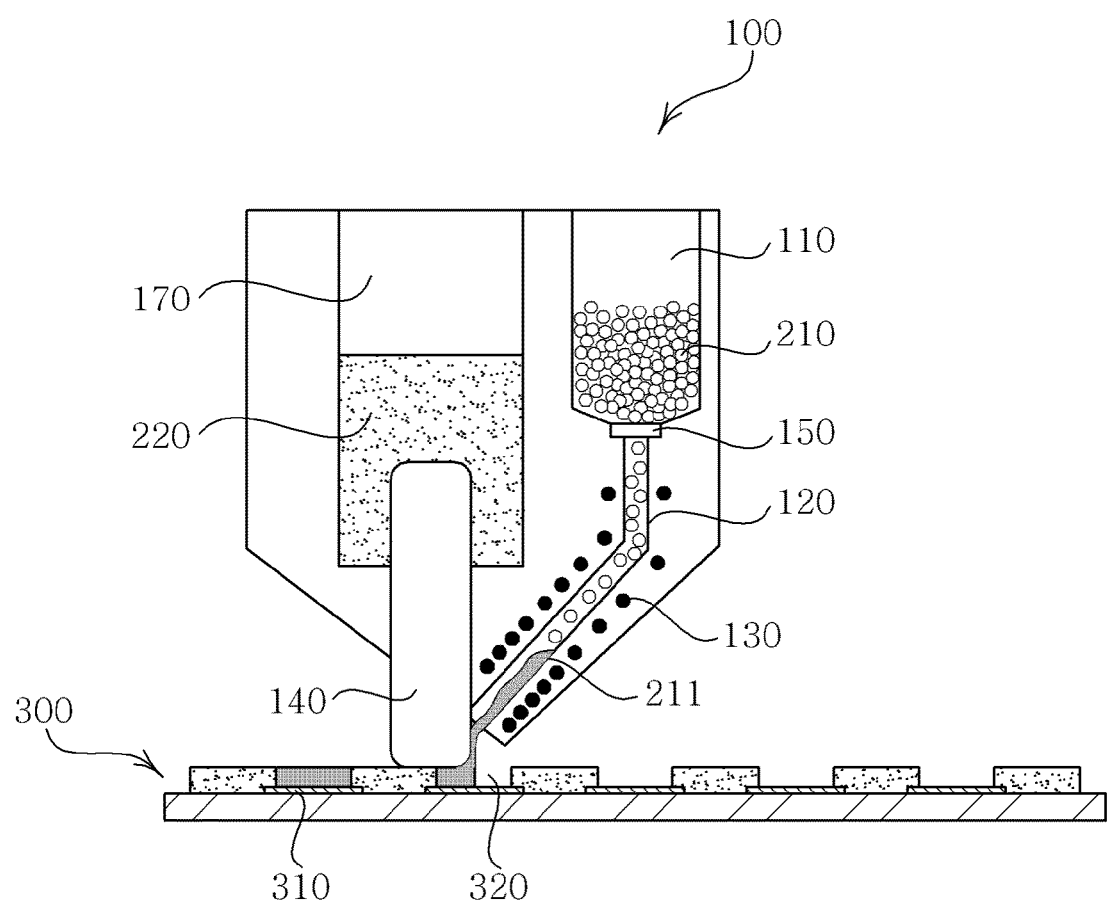
FIG. 4 is a diagram showing a solder injection head according to still another preferred embodiment of the present invention.

FIG. 4 is a diagram showing a solder injection head according to still another preferred embodiment of the present invention.

Referring to FIG. 4, the solder injection head 100 may include a bump material storing part 110, a discharging part 120, a heating part 130, a press-fitting part 140, a controlling part 150, and a flux storing part 170.

The bump material storing part 110 may have a bump material 210 stored therein. The bump material 210 may be a solder ball or a solder paste. However, the bump material 210 is not limited to the solder ball or the solder paste, but may also be any materials selected by those skilled in the art as long as it may form a bump. In addition, although not shown, both of the bump material 210 and a flux may be stored in the bump material storing part 110.

One side of the discharging part 120 may be connected to the bump material storing part 110 and the other side thereof may be connected to the outside. The discharging part 120 may discharge the bump material 210 stored in the bump material storing part 110 to the outside. Here, the bump material 210 may be heated and melted by the heating part 130 while passing through the discharging part 120. That is, the bump material 210 may be discharged in a melted state 211 when being discharged to the outside through the discharging part 120.

The heating part 130 may be formed at at least one side of the discharging part 120. The heating part 130 may heat the bump material 210 passing through the discharging part 120. In the preferred embodiment of the present invention, the case in which the heating parts 130 are formed at both sides of the discharging part 120 is shown. For example, the heating part 130 may be a heater. However, a kind of heating part 130 is not limited to the heater. That is, any heating part 130 may be used as long as it may heat the bump material 210 passing through the discharging part 120 to make the heated bump material 210 a melted state 211. In addition, the number or the positions of the heating part 130 may be easily modified by those skilled in the art.

The press-fitting part 140 may inject the bump material 210 in the melted state 211 discharged through the discharging part 120 onto the substrate 300. Here, the press-fitting part 140 may move vertically to press-fit the bump material 210, thereby injecting the bump material 210 onto a pad 310 of the substrate 300. The vertical movement of the press-fitting part 140 may be performed by vertical movement of the solder injection head 100.

The controlling part 150 may be formed between the bump material storing part 110 and the discharging part 120. The controlling part 150 may control an amount of bump material introduced into the discharging part 120. The controlling part 150 may be a valve, a rotating disk, or the like. However, a kind of controlling part is not limited thereto. That is, any controlling part may be used as long as it may control an amount of bump material 210 discharged to the discharging part 120.

The flux storing part 170 may have a flux 220 stored therein. The flux storing part 170 may have the press-fitting part 140 partially inserted thereinto. The flux 220 may flow through the press-fitting part 140 inserted into the flux storing part 170 by a capillary phenomenon to thereby be continuously discharged to the outside.

The solder injection head 100 according to the preferred embodiment of the present invention may separately discharge the bump material 210 and the flux 200. The solder injection head 100 may heat only the bump material 210 except for the flux 200. After the bump material 210 is heated, the flux 220 is added to the bump material 210, thereby making it possible to prevent the bump material 210 from being re-oxidized after being injected onto the substrate 300.

Figure 5:
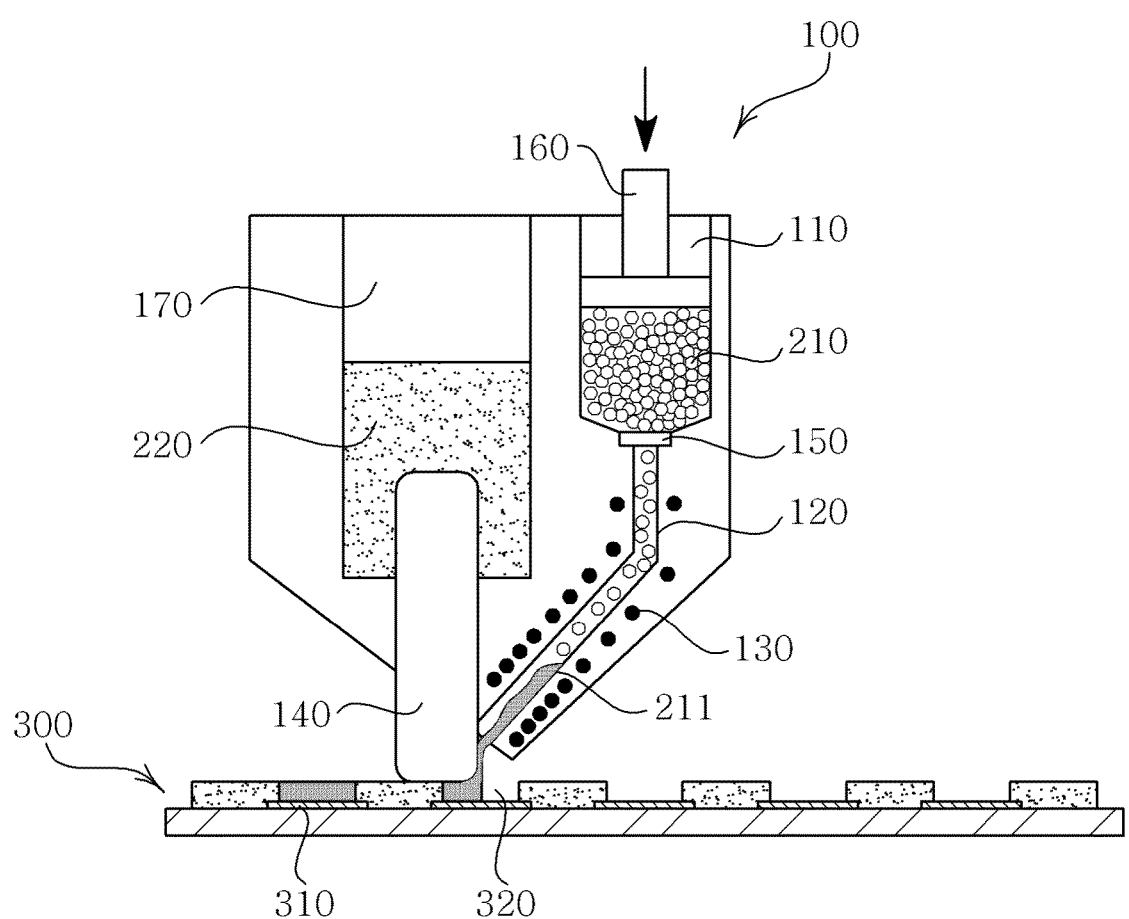
FIG. 5 is a diagram showing a solder injection head according to still another preferred embodiment of the present invention.

FIG. 5 is a diagram showing a solder injection head according to still another preferred embodiment of the present invention.

Referring to FIG. 5, the solder injection head 100 may include a bump material storing part 110, a discharging part 120, a heating part 130, a press-fitting part 140, a controlling part 150, a pressure bar 160, and a flux storing part 170.

The bump material storing part 110 may have a bump material 210 stored therein. The bump material 210 may be a solder ball or a solder paste. However, the bump material 210 is not limited to the solder ball or the solder paste, but may also be any materials selected by those skilled in the art as long as it may form a bump. In addition, although not shown, both of the bump material 210 and a flux may be stored in the bump material storing part 110.

One side of the discharging part 120 may be connected to the bump material storing part 110 and the other side thereof may be connected to the outside. The discharging part 120 may discharge the bump material 210 stored in the bump material storing part 110 to the outside. Here, the bump material 210 may be heated and melted by the heating part 130 while passing through the discharging part 120. That is, the bump material 210 may be discharged in a melted state 211 when being discharged to the outside through the discharging part 120.

The heating part 130 may be formed at at least one side of the discharging part 120. The heating part 130 may heat the bump material 210 passing through the discharging part 120. In the preferred embodiment of the present invention, the case in which the heating parts 130 are formed at both sides of the discharging part 120 is shown. For example, the heating part 130 may be a heater. However, a kind of heating part 130 is not limited to the heater. That is, any heating part 130 may be used as long as it may heat the bump material 210 passing through the discharging part 120 to make the heated bump material 210 a melted state 211. In addition, the number or the positions of the heating part 130 may be easily modified by those skilled in the art.

The press-fitting part 140 may inject the bump material 210 in the melted state 211 discharged through the discharging part 120 onto the substrate 300. Here, the press-fitting part 140 may move vertically to press-fit the bump material 210, thereby injecting the bump material 210 onto a pad 310 of the substrate 300. The vertical movement of the press-fitting part 140 may be performed by vertical movement of the solder injection head 100.

The controlling part 150 may be formed between the bump material storing part 110 and the discharging part 120. The controlling part 150 may control an amount of bump material introduced into the discharging part 120. The controlling part 150 may be a valve, a rotating disk, or the like. However, a kind of controlling part is not limited thereto. That is, any controlling part may be used as long as it may control an amount of bump material 210 discharged to the discharging part 120.

The pressure bar 160 may be inserted into the bump material storing part 110. The pressure bar 160 may move vertically to push the bump material 210 to the discharging part 120. The pressure bar 160 as described above may allow the bump material stored in the bump material storing part 110 to be smoothly discharged to the discharging part 120.

The flux storing part 170 may have a flux 220 stored therein. The flux storing part 170 may have the press-fitting part 140 partially inserted thereinto. The flux 220 may flow through the press-fitting part 140 inserted into the flux storing part 170 by a capillary phenomenon to thereby be continuously discharged to the outside.

Figure 6:
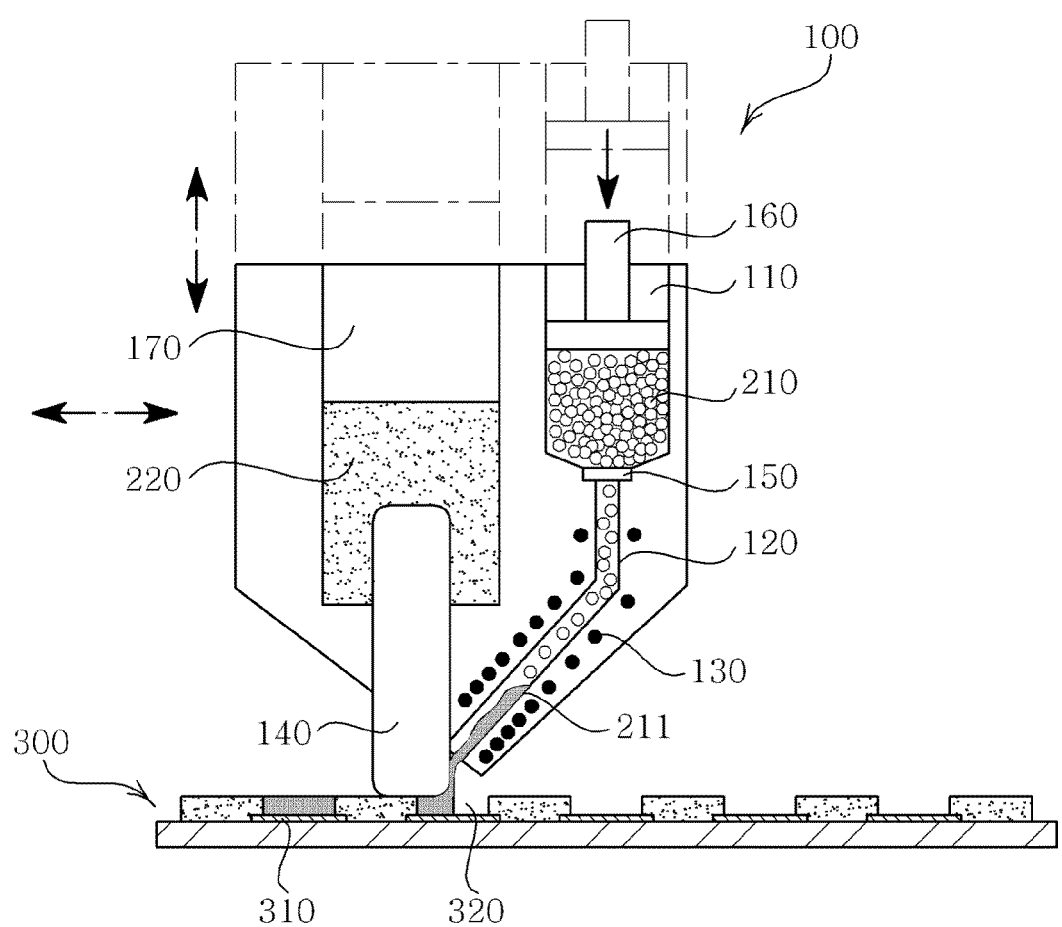
FIG. 6 is a diagram showing injection of a bump material by the solder injection head according to the preferred embodiment of the present invention.

FIG. 6 is a diagram showing injection of a bump material by the solder injection head according to the preferred embodiment of the present invention.

Referring to FIG. 6, the solder injection head 100 may simultaneously perform vertical direction movement and lateral direction movement.

The solder injection head 100 may apply the bump material 210 in the melted state 211 and the flux 220 onto the substrate 300 while moving laterally. In this case, pads 310 on which a bump (not shown) is to be formed and openings 320 exposing the pads 310 may be formed on the substrate 300. The solder injection head 100 may apply the bump material 210 and the flux 200 over the entire upper portion of the substrate 300. Alternately, the solder injection head 100 may apply the bump material 210 and the flux 220 only onto the openings 320. As described above, after the bump material 210 and the flux 220 are applied onto the substrate 300, the solder injection head 100 may move vertically. As the solder injection head 100 moves vertically, the press-fitting part 140 may also move vertically. The bump material 210 in the melted state 211 and the flux 220 applied on the substrate 300 may be press-fitted by the press-fitting part 140 moving vertically. As a result, the bump material 210 and the flux 220 applied on the opening 320 may also be press-fitted to thereby be filled in the opening 320.

The solder injection head 100 according to the preferred embodiment of the present invention may control the amount of discharged bump material 210, thereby uniformly applying the bump material 210 onto the substrate 300. In addition, the solder injection head 100 may inject the bump material 210 into a plurality of openings 320 in the press-fitting way, thereby filling a uniform amount of bump material 210 in each of the openings 320.

The solder injection head according to the preferred embodiments of the present invention heats and melts only the bump material which is to be discharged to the outside, thereby making it possible to prevent the bump material from being left in the melted state for a long period of time and oxidized.

The solder injection head according to the preferred embodiments of the present invention controls the amount of bump material which is to be discharged to the outside by the controlling part, thereby making it possible to prevent the bump material from being wasted.

The solder injection head according to the preferred embodiments of the present invention controls the amount of bump material which is to be melted, thereby making it possible to apply a uniform amount of melted bump material onto the substrate.

The solder injection head according to the preferred embodiments of the present invention heats the bump material and adds the flux to the bump material, thereby making it possible to prevent the bump material applied onto the substrate from being re-oxidized.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A solder injection head comprising:
    a bump material storing part having a bump material stored therein;

a discharging part having one side connected to the bump material storing part and discharging the bump material to an outside of the solder injection head;

a heating part formed at at least one lateral side of the discharging part and being separate from the bump material storing part to heat and melt only the bump material which is to be discharged to the outside excluding the bump material stored in the bump material storing part; and a press-fitting part press-fitting the bump material discharged to the outside and injecting the bump material onto a substrate.

2. The solder injection head as set forth in claim 1, wherein the press-fitting part moves vertically to inject the discharged bump material onto the substrate.

3. The solder injection head as set forth in claim 1, wherein the press-fitting part is made of porous silicon rubber or ceramic.

4. The solder injection head as set forth in claim 1, further comprising a pressure bar inserted into the bump material storing part and pushing the bump material to the discharging part.

5. The solder injection head as set forth in claim 1, further comprising a flux storing part having a flux stored therein.

6. The solder injection head as set forth in claim 5, wherein the press-fitting part is formed to be partially inserted into the flux storing part.

7. The solder injection head as set forth in claim 6, wherein the press-fitting part discharges the flux to the outside.

8. The solder injection head as set forth in claim 1, wherein the bump material storing part stores both of the bump material and a flux.

9. The solder injection head as set forth in claim 1, further comprising a controlling part formed between the bump material storing part and the discharging part and controlling an amount of bump material introduced into the discharging part.

10. The solder injection head as set forth in claim 1, wherein the bump material is a solder ball or a solder paste.

11. A solder injection head comprising:

a bump material storing part having a bump material stored therein;

a discharging part having one side connected to the bump material storing part and discharging the bump material to the outside;

a heating part formed at least one side of the discharging part and heating the bump material passing through the discharging part;

a press-fitting part press-fitting the bump material discharged to the outside and injecting the bump material onto a substrate; and a flux storing part having a flux stored therein;

wherein the press-fitting part is formed to be partially inserted into the flux storing part.

12. The solder injection head as set forth in claim 11, wherein the press-fitting part discharges the flux to the outside.

* * * * *